(12) United States Patent
Friesel

(10) Patent No.: US 9,733,341 B1
(45) Date of Patent: Aug. 15, 2017

(54) SYSTEM AND METHOD FOR COVARIANCE FIDELITY ASSESSMENT

(71) Applicant: Lockheed Martin Corporation, Bethesda, MD (US)

(72) Inventor: Mark A. Friesel, Ewing, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 312 days.

(21) Appl. No.: 14/636,945

(22) Filed: Mar. 3, 2015

(51) Int. Cl.
*G01S 7/40* (2006.01)

(52) U.S. Cl.
CPC .................. *G01S 7/4004* (2013.01)

(58) Field of Classification Search
CPC ........................................... G01S 7/4004
USPC .................................. 342/173, 174
See application file for complete search history.

(56) References Cited

U.S. PATENT DOCUMENTS

| | | | |
|---|---|---|---|
| 5,325,098 A | 6/1994 | Blair et al. | |
| 6,226,409 B1 | 5/2001 | Cham et al. | |
| 6,278,401 B1 | 8/2001 | Wigren | |
| 7,009,554 B1* | 3/2006 | Mookerjee | G01S 7/003 342/195 |
| 7,180,443 B1 | 2/2007 | Mookerjee et al. | |
| 7,277,047 B1 | 10/2007 | Mookerjee et al. | |
| 7,375,679 B1* | 5/2008 | Mookerjee | G01S 7/295 342/162 |
| 7,705,780 B1 | 4/2010 | Khoury | |
| 7,719,461 B1 | 5/2010 | Mookerjee et al. | |
| 8,886,394 B2 | 11/2014 | Noonan | |
| 2005/0114023 A1* | 5/2005 | Williamson | G01C 21/165 701/472 |
| 2005/0128138 A1 | 6/2005 | McCabe et al. | |
| 2007/0118286 A1* | 5/2007 | Wang | G01C 21/165 342/357.59 |

(Continued)

OTHER PUBLICATIONS

Y. Bar-Shalom, M. Mallick, H. Chen, and R. Washburn, "One-Step Solution for the General Out-of-Sequence-Measurement Problem in Tracking," Proceedings of 2002 IEEE Aerospace Conference Proceedings, vol. 4, pp. 1551-1559, 2002.

(Continued)

*Primary Examiner* — John B Sotomayor
(74) *Attorney, Agent, or Firm* — Howard IP Law Group, P.C.

(57) ABSTRACT

A system for testing the covariance fidelity of an optimal reduced state estimator comprises data storage devices for storing testing data, computer processors in communication with the data storage devices, and a memory storing program instructions for execution by the computer processors. Execution of the program instructions may cause the computer processors to provide an optimal reduced state estimator having state variables and unknown, multidimensional, arbitrarily time-varying parameters, subject to known bounded values. A random component and a bias component of the optimal reduced state estimator may be identified, and then separate evaluations of the components may be performed to determine a fidelity of the optimal reduced state estimator. The random component may be evaluated at a selected epoch and a Mahalanobis Distance Value determined for the random component. The bias component may be evaluated at the selected epoch and a probability of containment determined at a selected MDV.

20 Claims, 10 Drawing Sheets

(56) References Cited

U.S. PATENT DOCUMENTS

2008/0120031 A1   5/2008   Rosenfeld et al.
2009/0231183 A1   9/2009   Nettleton et al.

OTHER PUBLICATIONS

G.J. Portmann, J.R. Moore, and W.G. Bath, "Separated Covariance Filtering," Record of the IEEE 1990 International Radar Conference, 1990, pp. 456-460.

Y. Bar-Shalom, "Update with Out-of-Sequence Measurements in Tracking: Exact Solution," IEEE Transactions on Aerospace and Electronic Systems, pp. 769-778, vol. AES-38, No. 3, Jul. 2002.

E. Mazor, A. Averbuch, Y. Bar-Shalom, and J. Dayan, "Interacting Multiple Model Methods in Target Tracking: A Survey," IEEE Transactions on Aerospace and Electronic Systems, 34, 1 (Jan. 1998), 103-123.

W.D. Blair and Y. Bar-Shalom, "Tracking Maneuvering Targets with Multiple Sensors: Does More Data Always Mean Better Estimates?" IEEE Transactions on Aerospace and Electronic Systems, pp. 450-456, vol. AES-32, No. 1, Jan. 1996.

\* cited by examiner

SYSTEM AND METHOD FOR COVARIANCE FIDELITY ASSESSMENT

FIELD OF THE INVENTION

The present invention relates generally to testing the covariance fidelity of a state estimate system, and more particularly, to an optimal reduced state estimation system.

BACKGROUND

Consistent and accurate methods for performing state estimation in a wide-variety of systems are critical to the function of many processes and operations, both civilian and military. Systems and methods have been developed for state estimation of a system that may transition between different regimes of operation which may be described or defined by a plurality of discrete models. These state estimation methods can be applied to various systems having sensory inputs, by way of non-limiting example only, nuclear, chemical, or manufacturing factories or facilities, control processes subject to external parameter changes, space stations subject to vibrations, automobiles subject to road conditions, and the like. One particularly useful application for state estimation is tracking objects in flight, such as a multistage rocket that is transitioning back and forth between a ballistic model of flight and thrust modes, or an aircraft performing maneuvers mid-flight.

Popular state estimate systems include Kalman filters with white plant noise that are used as reduced state estimators. Recently, Optimal Reduced State Estimation (ORSE) filters for tracking an object have been developed. ORSE filters are reduced state because parametric acceleration is not represented in the filter model but is instead estimated as an independently calculated part of the covariance matrix. The filter is optimal because it reduces errors in the least squares sense. ORSE filters include bounds or maximum excursions for various parameters, and minimizes the mean-square and, thus, the root-mean-square (RMS) estimation errors for the maximum excursions of the parameters in the truth model. Furthermore, because the bounds are included in the minimized covariance, embodiments of the present invention do not need white plant noise, as is required by Kalman filters, to cope with the reduced state. U.S. Pat. No. 7,180,443, issued Feb. 20, 2007 in the names of Mookerjee and Reifler, which is incorporated by reference in its entirety, describes an ORSE state estimator for determining state estimation and state error covariances for generalized or arbitrary motion of a target or moving object where the sensors provide complete measurements, namely each measurement locating a point in three dimensional space at a known time with a non-singular measurement covariance matrix.

Because state estimate systems are critical to the function of many processes and operations, it is important that the covariance fidelity of such systems be assessed. Current tests for the covariance fidelity of state estimate systems are directed to assessing the fidelity of state estimate systems that are based on systems that use Kalman filters with white plant noise. These fidelity tests are inadequate for assessing the fidelity of ORSE systems. The current covariance fidelity test has two major shortcomings: first, there is no standard reference for the ORSE. The cumulative distribution function (cdf) of a multi-variate Gaussian is described by a chi-square distribution with r degrees of freedom, but ORSE bias distribution is specified only by a magnitude limit. Second, the outcome of a standard covariance test on a ORSE is ambiguous, in that further evaluation is required to determine if deviation is associated with the random or the bias component. In addition, for various reasons it is problematic to evaluate multiple independent bias sources represented by a Mahalanobis Distance Value (MDV). Examples are containment less than 100% when bias distribution is unspecified, and 100% containment bounds forming a rectangular prism rather than an ellipsoid.

Systems and methods for assessing the covariance fidelity of ORSE state estimation systems are desired.

SUMMARY

A system and method for assessing the covariance fidelity of ORSE state estimation systems is provided. In an embodiment, a system for testing a covariance fidelity of an optimal reduced state estimator (ORSE) comprises: one or more data storage devices for storing testing data; one or more computer processors in communication with the one or more data storage devices; and a memory storing program instructions which, when executed by the one or more computer processors, cause the one or more computer processors to: provide an optimal reduced state estimator having state variables and multidimensional time-varying parameters which are subject to known bounded values; identify a random component and a bias component of a covariance fidelity test of the optimal reduced state estimator; evaluate the random component of the covariance fidelity test at a selected epoch; evaluate the bias component of the covariance fidelity test at the selected epoch; and determine the covariance fidelity of the optimal reduced state estimator based on the evaluation of the random component of the covariance fidelity test and the evaluation of the bias component of the covariance fidelity test. The memory may store program instructions which cause the one or more computer processors to identify an optimal reduced state estimator covariance S=M+B comprised of a random component M and a bias component B. In an embodiment, the memory may store program instructions which cause the one or more computer processors to: apply a chi-square fidelity test to the random component of the covariance fidelity test using unbiased noisy input; and evaluate output data of the chi-square fidelity test at the selected epoch and determine a Mahalanobis Distance Value (MDV) of the random component alone.

The memory may also store program instructions which evaluate the random component of the covariance fidelity test at the selected epoch by causing the one or more computer processors to: identify an evaluation time n; apply zero-mean Gaussian noise N times as input measurements to the optimal reduced state estimator; and determine containment vs. $MDV_0$ at update n according to $$MDV_0 = \frac{X_n X_n^T}{\sigma_{m,n}^2}$$

wherein X are the random filter output errors and $\sigma^2_{m,n}$ is the random covariance represented in matrix form for multiple dimensions at n. In an embodiment, the memory may store program instructions to determine the covariance fidelity of the optimal reduced state estimator which cause the one or more computer processors to determine that the optimal reduced state estimator passes the random component of the covariance fidelity test when a probability of containment of $(1-\alpha)$ corresponds to an MDV falling within a selected tolerance limit of an ideal cumulative distribution function $\chi^2(1,\alpha)$. In another embodiment, the memory may store program instructions to evaluate the random component of the covariance fidelity test at the selected epoch which cause the one or more computer processors to: identify an evaluation time n; apply multi-dimensional white noise N times as input measurements to the optimal reduced state estimator; and determine containment vs. $MDV_0$ at update n according to $MDV_0 = X_n M_n^{-1} X_n^T$ wherein X are the random filter output errors and M is the random covariance component.

In an embodiment, the memory may store program instructions which determine the covariance fidelity of the optimal reduced state estimator by causing the one or more computer processors to determine that the optimal reduced state estimator passes the random component of the covariance fidelity test when a probability of containment of $(1-\alpha)$ corresponds to an MDV falling within $\chi^2(r,\alpha)$ for any number of degrees of freedom/dimensions r. In an embodiment, the memory may store program instructions which evaluate the bias component of the covariance fidelity test at the selected epoch by causing the one or more computer processors to: initialize the bias component of the covariance fidelity test with a diagonal matrix of eigenvalues $\Lambda$ representing a squared maximum bias that a target is expected to experience over an interval; input measurements to the optimal reduced state estimator that do not exceed the maximum bias; generate a covariance fidelity plot corresponding to $$MDV_0 = \frac{X_n X_n^T}{\sigma_{b,n}^2}$$

wherein X are the biased filter output errors and $\sigma_{b,n}^2$ is the one-dimensional bias covariance represented in matrix form for multiple dimensions; and determine, based on the covariance fidelity plot, a probability of containment at 1 MDV. In an embodiment the memory may store program instructions which determine the covariance fidelity of the optimal reduced state estimator by causing the one or more computer processors to determine that the optimal reduced state estimator passes the bias component of the covariance fidelity test when the determined probability of containment at 1 MDV is 100%.

In an embodiment, a method for testing a covariance fidelity of an optimal reduced state estimator (ORSE) may comprise: providing, by one or more computer processors, an optimal reduced state estimator having state variables and multidimensional time-varying parameters which are subject to known bounded values; identifying, by the one or more computer processors, a random component of a covariance fidelity test of the optimal reduced state estimator and a bias component of the covariance fidelity test of the optimal reduced state estimator; evaluating, by the one or more computer processors, the random component of the covariance fidelity test at a selected epoch; evaluating, by the one or more computer processors, the bias component of the covariance fidelity test at the selected epoch; and determining, by the one or more computer processors, the covariance fidelity of the optimal reduced state estimator based on the evaluation of the random component of the covariance fidelity test and the evaluation of the bias component of the covariance fidelity test. In an embodiment, evaluating the random component of the covariance fidelity test at the selected epoch may comprise: applying, by the one or more computer processors, a chi-square fidelity test to the random component of the ORSE using unbiased noisy input; and evaluating, by the one or more computer processors, output data of the chi-square fidelity test at the selected epoch and determining a Mahalanobis Distance Value (MDV) of the random component alone. In an embodiment, evaluating the random component of the covariance fidelity test at the selected epoch of the random component may comprise: identifying, by the one or more computer processors, an evaluation time n; applying, by the one or more computer processors, zero-mean Gaussian noise N times as input measurements to the optimal reduced state estimator; and determining, by the one or more computer processors, containment vs. $MDV_0$ at update n according to $$MDV_0 = \frac{X_n X_n^T}{\sigma_{m,n}^2}$$

wherein X are the random filter output errors and $\sigma_{m,n}^2$ is the random covariance represented in matrix form for multiple dimensions at n.

Determining the covariance fidelity of the optimal reduced state estimator may comprise determining, by the one or more computer processors, that the optimal reduced state estimator passes the random component of the covariance fidelity test when a probability of containment of $(1-\alpha)$ corresponds to an MDV falling within a selected tolerance limit of an ideal cumulative distribution function $\chi^2(1,\alpha)$. In an embodiment, evaluating the random component of the covariance fidelity test at the selected epoch may comprise: identifying, by the one or more computer processors, an evaluation time n; applying, by the one or more computer processors, multi-dimensional white noise N times as input measurements to the optimal reduced state estimator; and determining, by the one or more computer processors, containment vs. $MDV_0$ at update n according to $MDV_0 = X_n M_n^{-1} X_n^T$ wherein X are the random filter output errors and M is the random covariance component. Determining the covariance fidelity of the optimal reduced state estimator may comprise determining, by the one or more computer processors, that the optimal reduced state estimator passes the random component of the covariance fidelity test when a probability of containment of $(1-\alpha)$ corresponds to an MDV falling within $\chi^2(r,\alpha)$ for any number of degrees of freedom/dimensions r.

Evaluating the bias component of the covariance fidelity test at the selected epoch and determining a probability of containment at a selected MDV may comprise: initializing, by the one or more computer processors, the bias component of the covariance fidelity test with a diagonal matrix of eigenvalues $\Lambda$ representing a squared maximum bias that a target is expected to experience over an interval; inputting, by the one or more computer processors, measurements to the optimal reduced state estimator that do not exceed the maximum bias; plotting, by the one or more computer processors, the covariance fidelity corresponding to $$MDV_0 = \frac{X_n X_n^T}{\sigma_{b,n}^2}$$

wherein X are the biased filter output errors and $\sigma_{b,n}^2$ is the one-dimensional bias covariance represented in matrix form for multiple dimensions; and determining, by the one or more computer processors based on the covariance fidelity plot, the probability of containment at 1 MDV. In an embodiment, determining the covariance fidelity of the optimal reduced state estimator may comprise determining, by the one or more computer processors, that the optimal reduced state estimator passes the bias component of the covariance fidelity test when the determined probability of containment at 1 MDV is 100%.

A system for testing a covariance fidelity of an optimal reduced state estimator (ORSE) may comprise: one or more data storage devices for storing testing data; one or more computer processors in communication with the one or more data storage devices; and a memory storing program instructions which, when executed by the one or more computer processors, cause the one or more computer processors to: provide an optimal reduced state estimator having state variables and multidimensional time-varying parameters which are subject to known bounded values; identify a random component of a covariance fidelity test of the optimal reduced state estimator and a bias component of the covariance fidelity test of the optimal reduced state estimator; evaluate the random component of the covariance fidelity test at a selected epoch and determine a Mahalanobis Distance Value (MDV) of the random component by: identifying an evaluation time n; applying zero-mean Gaussian noise N times as input measurements to the optimal reduced state estimator; and determining containment vs. $MDV_0$ at update n according to $$MDV_0 = \frac{X_n X_n^T}{\sigma_{m,n}^2}$$

wherein X are the random filter output errors and $\sigma^2_{m,n}$ is the random covariance represented in matrix form for multiple dimensions at n; and evaluate the bias component of the covariance fidelity test at the selected epoch and determine a probability of containment at a selected MDV by: initializing the bias component of the covariance fidelity test with a diagonal matrix of eigenvalues $\Lambda$ representing a squared maximum bias that a target is expected to experience over an interval; inputting measurements to the optimal reduced state estimator that do not exceed the maximum bias; generating a covariance fidelity plot corresponding to $$MDV_0 = \frac{X_n X_n^T}{\sigma_{b,n}^2}$$

wherein X are the biased filter output errors and $\sigma^2_{b,n}$ is the one-dimensional bias covariance represented in matrix form for multiple dimensions; and determining, based on the covariance fidelity plot, the probability of containment at 1 MDV; and determine the covariance fidelity of the optimal reduced state estimator based on the evaluation of the random component of the covariance fidelity and the evaluation of the bias component of the covariance fidelity.

In an embodiment, the memory storing program instructions to determine the covariance fidelity of the optimal reduced state estimator may comprise program instructions which cause the one or more computer processors to determine that the optimal reduced state estimator passes the random component of the covariance fidelity test when the probability of containment of (1−α) corresponds to an MDV falling within a selected tolerance limit of an ideal cumulative distribution function $\chi^2(1,\alpha)$. The memory storing program instructions to determine the covariance fidelity of the optimal reduced state estimator may comprise program instructions which cause the one or more computer processors to determine that the optimal reduced state estimator passes the bias component of the covariance fidelity test when the determined probability of containment at 1 MDV is 100%.

DETAILED DESCRIPTION

Figure 1:
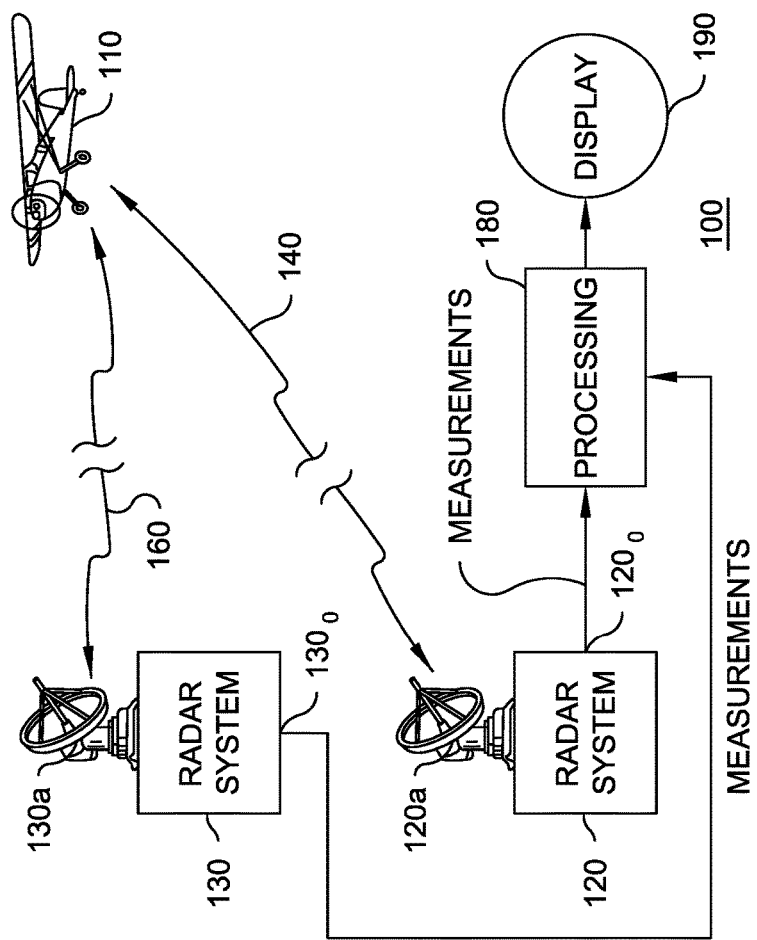
FIG. 1 depicts a simplified block diagram of an exemplary system for estimating the state of a target.

It is to be understood that the figures and descriptions of the present invention have been simplified to illustrate elements that are relevant for a clear understanding of the present invention, while eliminating, for purposes of clarity, many other elements found in state estimation systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Referring generally to FIG. 1, a simplified diagram of a target tracking system 100 is shown, of a type that may use an ORSE filter to track an object. System 100 may track a target, for example, an aircraft 110, transitioning back and forth between discrete models of flight (e.g. performing a direction change and continuing on a relatively linear flight path) using one or more sensors, such as a radar systems 120, 130. Radar systems 120, 130 include radar antennas 120a, 130a which transmit and subsequently receive radar signals 140, 160 reflected off target 110 and/or other background features. Returned signals 140, 160 allow the generation of measurements at output ports 1200, 1300 of the radar systems. These measurements include values of at least target position, which may be in the form of range and angles (e.g. elevation and azimuth) from the radar systems. In practice, these measurements may be corrupted by unknown random measurement noises. These noises may be characterized by a covariance and unknown time-varying biases having known bounds. The biases may be the result of, for example, sensor misalignment.

The measurements from radar systems 120, 130 are applied to a processing arrangement 180 for determining various target parameters, for example, course (i.e. direction of motion), speed, and target type. The estimated position of the target, and possibly other information, is provided to a utilization apparatus, for example, a radar display 190, for interpretation by an operator. The operator (or possibly automated decision-making equipment) can make decisions as to actions to be taken in response to the displayed information. While two radar systems 120 and 130 are shown in FIG. 1, it is understood that target tracking systems may include any suitable number of radar systems.

Figure 2:
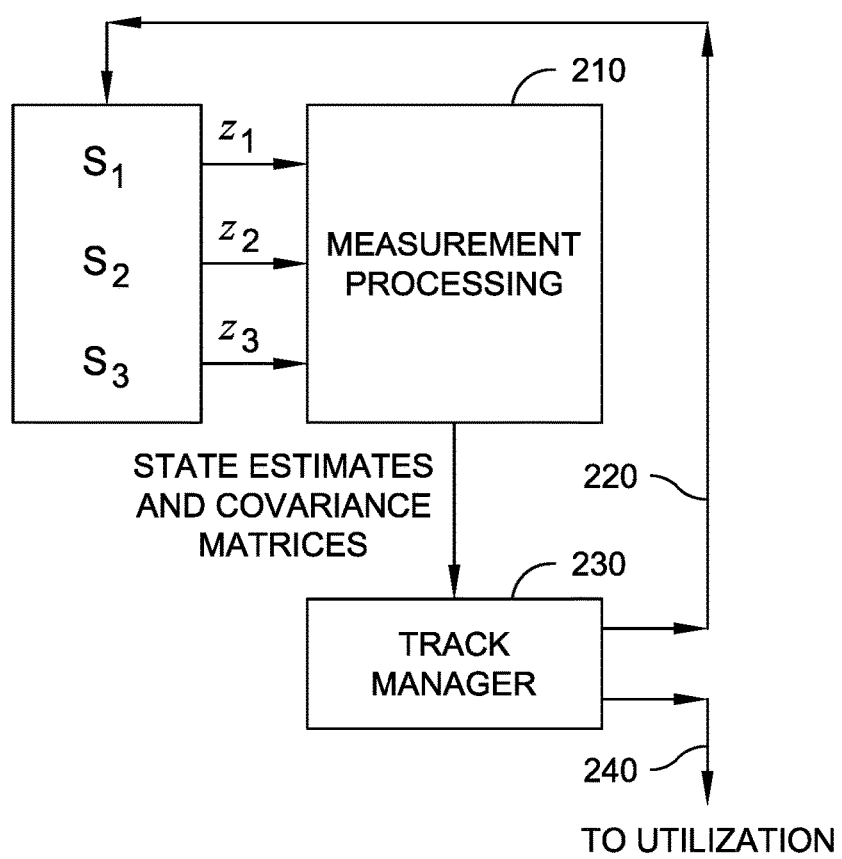
FIG. 2 depicts a notional processor which may perform calculations to estimate the state of the target together with its covariance.

FIG. 2 illustrates block 180 of FIG. 1, which represents a localized or distributed processor which may be used in a ORSE system or process. In FIG. 2, block 180 receives signals $z_1$, $z_2$, and $z_3$ representing measurements from radar systems, such as radar systems 120 and 130 of FIG. 1, and which processes the sensor measurements in attempting to estimate position and velocity states of the target 110 in FIG. 1. In FIG. 2, the resulting state estimates and covariance matrices are fed to a track manager, illustrated as a block 230, which may determine commands to accurately point or slew the radar (or other types of sensors) at or toward the target at the anticipated next opportunity for detecting the target. The commands may be fed by way of a path 220 back to the radar systems to adjust their pointing. The state estimates and covariances may also made available to one or more users by way of a path 240. The logic flow of the measurement processing to obtain state estimates and covariances is illustrated as 400 of FIG. 4.

Figure 3:
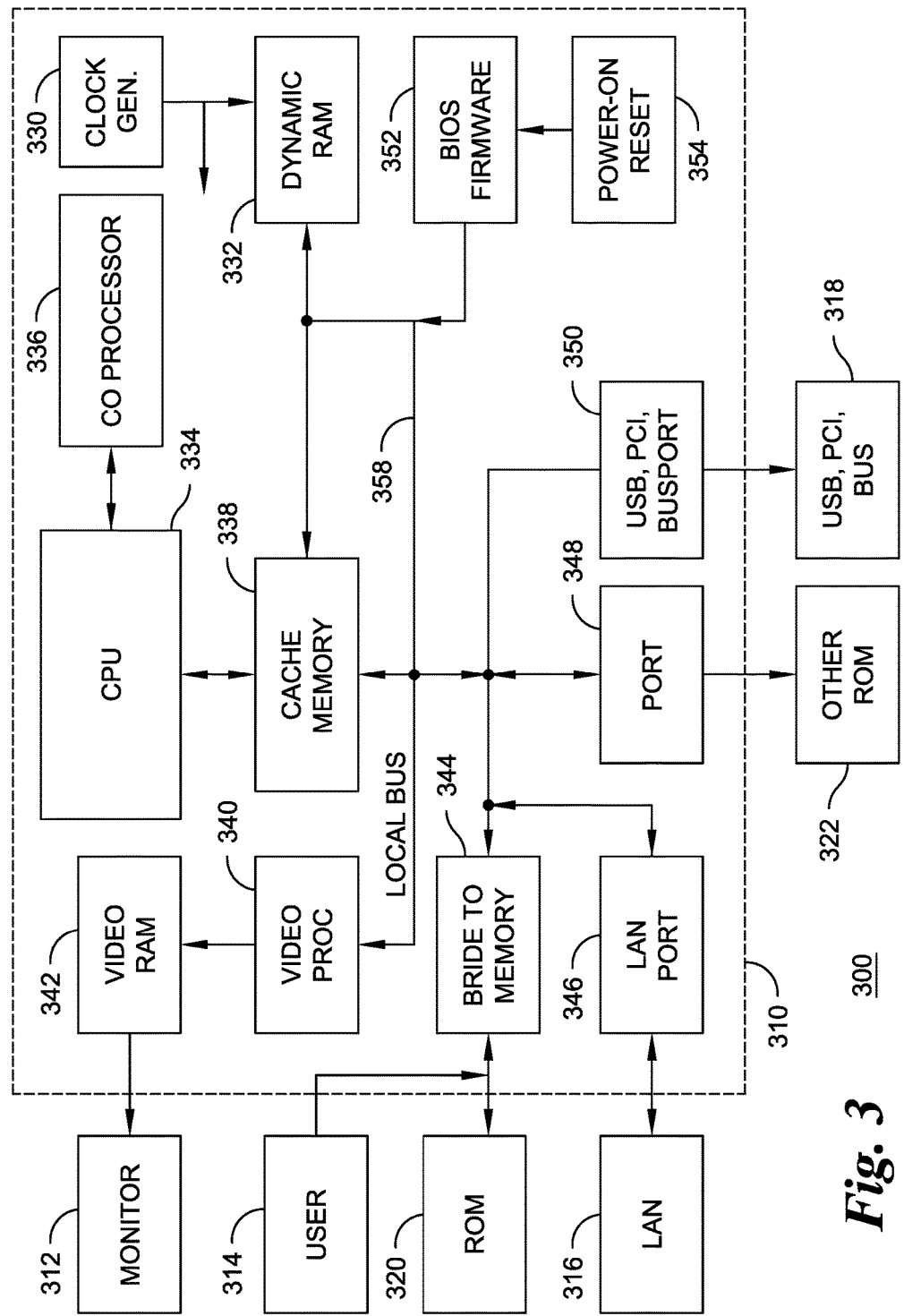
FIG. 3 depicts a representative computer or processor which may perform calculations and processing pursuant to the disclosure.

FIG. 3 is a simplified diagram in block and schematic form illustrating a representative computer which may be used as processor 210 of FIG. 2, in relation to an ORSE filter. In FIG. 3, computer 300 includes a processor or board 310 and outboard elements such as a monitor 312, user controls such as a keyboard and/or mouse, illustrated as a block 314, local area network (LAN) 316, additional buses 318 such as PCI and/or USB, and read-only memory (ROM) 320, which is ordinarily a hard drive, and additional ROM 322, which may be, for example, a flash memory stick or capacitance disk (CD). The main portion of the computer processor or board 310 includes a central processing unit (CPU) 334, which communicates with a cache dynamic memory 338. At initial turn-on of the computer 300, a power-on reset illustrated as a block 354 enables a preloaded basic input/output system (BIOS) flash memory, which loads cache 338 with information that initializes the booting sequence by the CPU. When booted, CPU 334 may communicate with a coprocessor illustrated as 336, and also communicates with main dynamic memory (DRAM) 332 and a local bus 358. Local bus 358 provides communication between the CPU and other elements of the computer, as for example the video processor 340 and video random-access memory 42 for driving a monitor. Local bus 58 also communicates by way of a bridge 344 to external ROM 320 and to user controls 318. Local bus 358 further communicates by way of a port 348 with other ROM 322 if desired, by way of a USB or PCI bridge or port 350 with external buses, and/or by way of a local area network (LAN) port 346 with a LAN 316. Those skilled in the art will understand how to use one or more computers to perform the processing required by elements of the disclosure.

Figure 4:
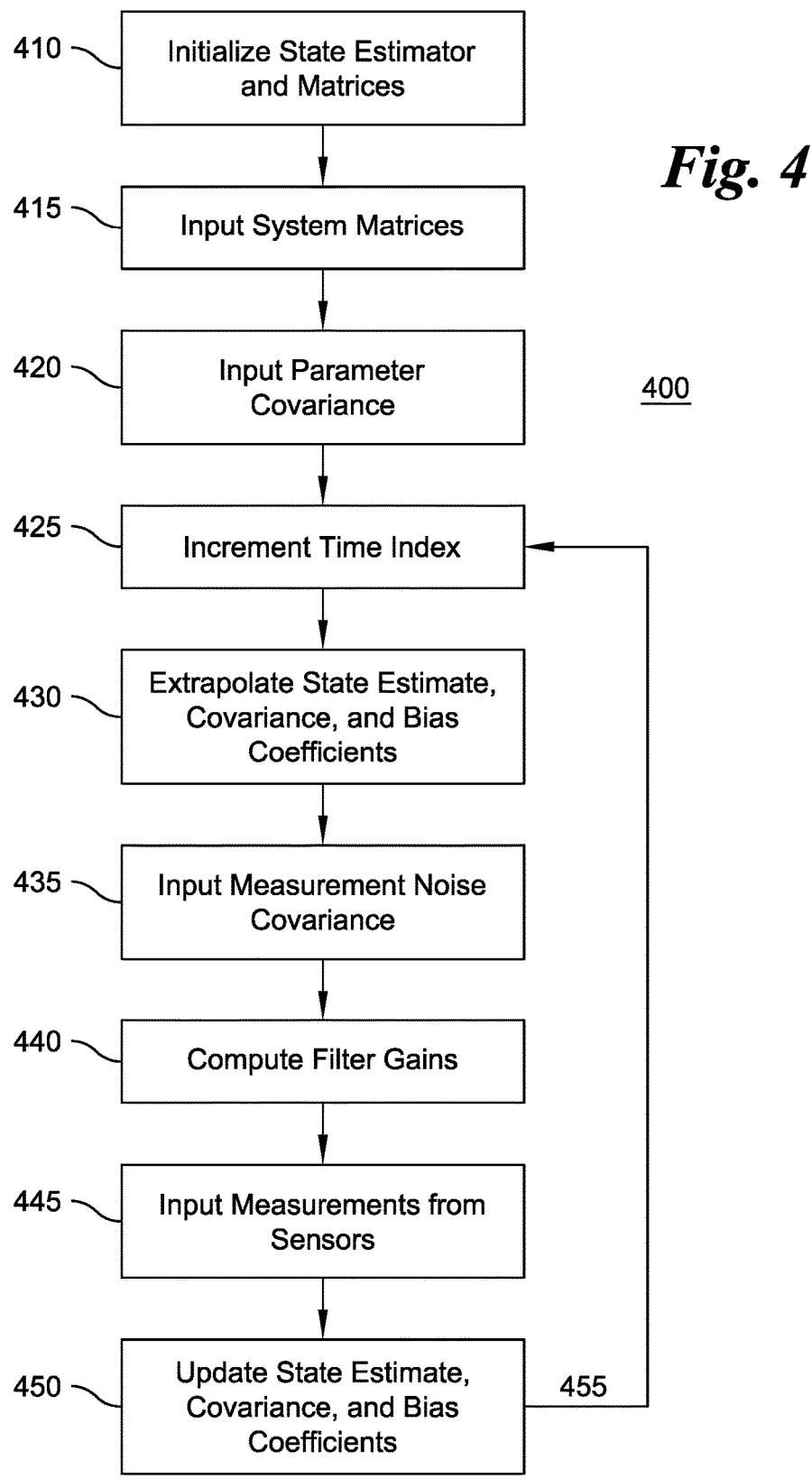
FIG. 4 depicts a flow diagram illustrating an optimal reduced state estimator according to an aspect of the disclosure.

The simplified logic flow chart or diagram 400 of FIG. 4 illustrates an embodiment of a method which may be used to implement an optimal reduced state estimator (also called an ORSE or ORSE filter) having state variables and unknown, multidimensional, arbitrarily time-varying parameters, subject to known bounded values. FIG. 4 generally illustrates an ORSE state estimator, which includes a process for updating boundary parameters that are used within the estimator. U.S. Pat. No. 7,180,443, issued Feb. 20, 2007 in the names of Mookerjee and Reifler, which is incorporated by reference in its entirety, generally describes an ORSE state estimator which operates using a single set of boundary parameters that are input during the initialization of the estimator. U.S. Pat. No. 7,180,443 describes, inter alia, how to determine state estimation and state error covariance for generalized or arbitrary motion of a target or moving object where the sensors provide complete measurements, namely each measurement locating a point in three dimensional space at a known time with a non-singular measurement covariance matrix. The embodiments of the system and method allow for a single ORSE filter to be active over the exo-endo atmospheric regions, without full parametric representation or devolution, i.e. retaining the benefit of an ORSE filter.

In FIG. 4, the logic flow of the invention begins with initialization of the state estimator $\hat{x}(k_0|k_0)$ and the matrices $M(k_0|k_0), D(k_0|k_0)$ at block 410. Matrix $M(k|k)$ is defined as the covariance of the state estimation errors at time $t_k$ due only to the errors in the measurements $z(i)$ for $1 \le i \le k$ and a priori initial information that is independent of the parameter uncertainty. Matrix $D(k|k)$ is defined as the matrix of bias coefficients, which linearly relates state estimation errors to the parameter errors, at time $t_k$ (after processing k=0, 1, 2, . . . measurements), where k refers to the $k^{th}$ update. The filter prediction of the $k+1^{st}$ state is made from the $k^{th}$ state and is written (k+1|k), and the smoothed state estimate calculated from the $k+1^{st}$ measurement given the predicted state is written (k+1|k+1) and is the filter estimate at increment k+1 i.e. time $t_{k+1}$. The initial information is obtained in order to begin processing. From block 410, the logic of the invention of FIG. 4 flows to a block 415, which represents the accessing or inputting of the system transition matrix $\Phi$ and input matrix $\Gamma$, where F and G are:

$$F = \phi + \Gamma \frac{\partial u}{\partial x}\bigg|_{x=\hat{x}(k|k), \lambda=\overline{\lambda}} \quad (1)$$

$$G = \Gamma \frac{\partial u}{\partial \lambda}\bigg|_{x=\hat{x}(k|k), \lambda=\overline{\lambda}} \quad (2)$$

From block 415, the logic of the invention of FIG. 4 flows to a block 420, which accesses or inputs a parameter matrix Λ. The parameter matrix Λ represents the physical bounds on the unknown parameters, such as turn rate and tangential acceleration, and is preferably selected based on a precise description of the physical system, and depends upon well-known physical phenomena and characteristics of real systems. Types of physical parameters, which might be considered for determination of Λ in the case of maneuvers, are the turn rate w and the tangential acceleration α. This is a departure from prior art methods that use a white process noise covariance W, which are inadequate for assessing the fidelity of ORSE systems.

From block 420 of FIG. 4, the logic flow of the invention proceeds to a block 425, which represents the incrementing of a time index k to k+1. The logic of the invention then flows to a further block 430, which represents the extrapolation of state estimates $\hat{x}(k|k)$, and matrices $M(k|k)$, $D(k|k)$ according to $$\hat{x}(k+1|k) = \Phi \hat{x}(k|k) + \Gamma u(\hat{x}k|k), \overline{\lambda} \quad (3)$$

$$M(k+1|k) = FM(k|k)\Gamma' \quad (4)$$

$$D(k+1|k) = FD(k|k) + G \quad (5)$$

$$S(k+1|k) = M(k+1|k) + D(k+1|k)\Lambda D(k+1|k)' \quad (6)$$

From block 430 of FIG. 4, the logic of the invention flows to a block 435, which represents the accessing or inputting of the measurement noise covariance N. Block 440 represents the computation of the filter gain matrix K, and filter matrices Q, and L. The filter gain matrix K obtained in block 322 of the arrangement of FIG. 4 is obtained through use of $M(k+1|k), D(k+1|k)$ and A to formula $S(k+1|k)$ in equation (6). The covariance of the residual Q is calculated as:

$$Q = HS(k+1|k)H' + N \quad (7)$$

The filter gain matrix K is calculated as:

$$K = S(k+1|k)H'Q^{-1} \quad (8)$$

and the matrix L is calculated as L=I−KH (33) where I is the identity matrix. From block 440 of FIG. 4, the logic flows to a further block 445, which represents the measurement z(k+1) of aspects of the state of the system.

The logic may then flow from block 445 of FIG. 4 to a block 450, which represents the updating of the state estimate and the associated matrices. More particularly, the state estimate $\hat{x}(k+1|k+1)$ is calculated as $$\hat{x}(k+1|k+1) = \hat{x}(k+1|k) + K[z(k+1) - H\hat{x}(k+1|k)] \quad (9)$$

The matrices $M(k+1|k+1)$ and $D(k+1|k+1)$ are calculated as $$M(k+1|k+1) = LM(k+1|k)L' + KNK' \quad (10)$$

and $$D(k+1|k+1) = LD(k+1|k) \quad (11)$$

respectively. Then, the matrix of the total covariance is calculated as $$S(k+1|k+1) = M(k+1|k+1) + D(k+1|k+1)\Gamma D(k+1|k+1)' \quad (12)$$

and equation (12) represents a mean-square criterion which may be used for a root-mean-square determination. The logic may then flow from block 450 by path 455 to block 425 where the time interval is incremented and the process continues receiving measurement data from the sensors and estimating the state of the object.

A new fidelity test may be adapted which will operate with the structure of an ORSE estimator, such as the ORSE estimator described herein, which includes separate tests applied to the random and bias components of the ORSE. In an embodiment of the ORSE fidelity test, the chi-square fidelity test is applied only to the random component of the ORSE, and evaluated with unbiased noisy input. The data is evaluated at a selected epoch with Mahalanobis Distance Value (MDV) determined from the random covariance alone. A second test for bias fidelity is applied to the bias component of the ORSE, which may be carried out using noise-free representative bias as the filter input. At the selected epoch the probability of containment at MDV=1 is determined, where MDV is calculated using only the bias covariance. To pass, the containment probability must be 100% regardless of the input bias behavior (subject to filter assumptions, i.e. a maximum bias value).

Generally, a covariance fidelity test is a test of the Gaussian character of random data. In an embodiment, the test is used on data produced by a Kalman filter at a given epoch to evaluate the filter's response to Gaussian random input data with the proscribed covariance. For reference, the cumulative distribution function (cdf) of a standard normal distribution is obtained. The $\chi^2(r,\alpha)$ value for r degrees of freedom and residual probability α is the Mahalanobis Distance Value (MDV) corresponding to (1−α) probability of containment of the tracked target. Filter performance is evaluated by requiring attainment of (1−α) containment for MDV within (1±β) % of the $\chi^2(r,\alpha)$ value where β is some desired performance threshold.

One approach to evaluating covariance fidelity is to select an evaluation time. Filter pseudo-measurements are generated by random sampling from a Gaussian distribution with the filter's measurement noise. Each input sample is filtered to the evaluation time and the state updates are stored. The MDV value is calculated for each sample, and a sample cumulative distribution found by the fraction of samples with MDV less than or equal to the selected value. Alternatively the MDV can be calculated per update over a time interval, and the cdf calculated similarly.

In an embodiment, the ORSE covariance may be represented by S=M+B, comprised of a random covariance component M consistent with the covariance fidelity test, and a bias covariance component B corresponding to 100% bias containment. The standard covariance fidelity test, using S to calculate the MDV values, is ambiguous in that a) there is no standard reference, and b) the source of a deviation from a correctly implemented filter cannot be determined without additional evaluation.

In one dimension $S = \to \sigma_s = \sqrt{(\sigma_m^2 + \sigma_b^2)}$ where the bias variance $\sigma_b^2$ is a non-zero value. The covariance fidelity test is run by identifying an evaluation time or update. To evaluate the filter performance, the filter is first run N times with only zero-mean random Gaussian noise on the input measurements. Covariance fidelity is illustrated by plotting containment vs. $MDV_0$ at update n where X is the filter output error and $\sigma^2_{m,n}$ is the random covariance represented in matrix form for multiple dimensions at n:

$$MDV_0 = \frac{X_n X_n^T}{\sigma_{m,n}^2} \quad (13)$$

Containment must satisfy the selected conditions, i.e. for the ideal Gaussian distribution there is a unique probability $(1-\alpha)$ that a random sample will have an MDV not exceeding $\chi^2(1,\alpha)$. For covariance fidelity testing the probability $(1-\alpha)$ must correspond to an MDV falling within $\chi^2(1,\alpha) \pm c$ where c is typically 5- or 10%. For multi-dimensional white noise with $$MDV_0 = X_n M_n^{-1} X_n^T \quad (14)$$

where $X_n$ is the filter output error at update n and M is the random covariance component at update n, the same test is applied with reference $\chi^2(r,\alpha)$ for any number of degrees of freedom/dimensions r. The random samples for the covariance fidelity test may be obtained at any time after the filter settles. This permits a test to be performed on either a single trajectory or multiple trajectories, with arbitrary sample times subject to the settling constant. Thus, the method for testing the random component of the covariance may be applied even when successive Mahalanobis values are not calculated at the same index. For example, N outputs and their covariances at N arbitrary indices may be obtained from 1 or more runs of the filter. Then the Mahalanobis values may be calculated for each output and then plotted, from which a fidelity determination may be made. Alternatively, the filter may be run N times, with an output obtained at a specific index n each time the filter is run. Then the Mahalanobis values are calculated for each output and then plotted. Either method of data collection may be used to test the fidelity of the filter, providing flexibility in the implementation of the fidelity test.

The bias component is evaluated somewhat differently, particularly when no assumption about the bias distribution can be made. This occurs, for example, when the bias represents the uncompensated acceleration of a piloted aircraft, since the pilot may execute the maximum acceleration at any time, or fly at nearly constant velocity to his destination. The bias component of the ORSE covariance is initialized with a diagonal matrix of eigenvalues $\Lambda$ representing the squared maximum bias that the target is expected to experience over an interval. The data input to the filter is arbitrary as long as it satisfies the bias assumption, i.e. that the squared magnitude of bias does not exceed the eigen values of $\Lambda$. At evaluation time a covariance fidelity plot may be created in the same manner as for random Gaussian data using $$MDV_0 = \frac{X_n X_n^T}{\sigma_{b,n}^2} \quad (15)$$

or $$MDV_0 = X_n B_n^{-1} X_n^T \quad (16)$$

for the general case, where X are the biased filter output errors, $\sigma_{b,n}$ is the one-dimensional bias covariance represented in matrix form for multiple dimensions, and B is the bias covariance component. Bias covariance fidelity is then met if probability of containment at 1 MDV is 100%. Similarly if bias is constrained between two limits the test above may be run for each limit with performance indicated by containment between the MDVs corresponding to each limit. As will be understood, in an embodiment an actual plot need not be made, and instead the values may be determined by the formula and compared to a probability of containment at 1 MDV.

For example, the filter may be run N times and the filter error found at a given update, n, each time. These filter errors are the measurements minus the truth. The distribution of these filter errors should be a Gaussian cdf, if the input errors are white and unbiased, that shows the probability of obtaining a given error at this time. If the error is squared and divided by the variance (in a 1-dimensional example), the MDV is obtained. The cumulative distribution as a function of MDV is ideally the chi-square distribution if the noise is Gaussian and unbiased, and the filter is written correctly. From the above equations, a plot may be made with the normalized number of error samples (the fraction of samples) with MDV less than or equal to each MDV. By way of further example, the filter errors at all n updates for one run of the filter may be obtained, and each squared error may be divided by its filter covariance (at the corresponding measurement time) to get the corresponding MDV for each update. This also provides the cumulative distribution as a function of MDV.

With more than one source of bias, each source may be evaluated independently by the above procedure. In an embodiment, input representing bias (satisfying assumptions) from a bias source j is evaluated using only $\sigma_{bj}$. As a note, it may not be correct to carry out the above evaluation with more than one orthogonal bias contributors represented as a single bias matrix. In brief, $\chi^2$ containment surfaces are ellipsoids, and the same is true of bias from a single source when the components are related through a maximum magnitude constraint. Independent bias, however, may simultaneously reach their maximum values.

Figure 5:
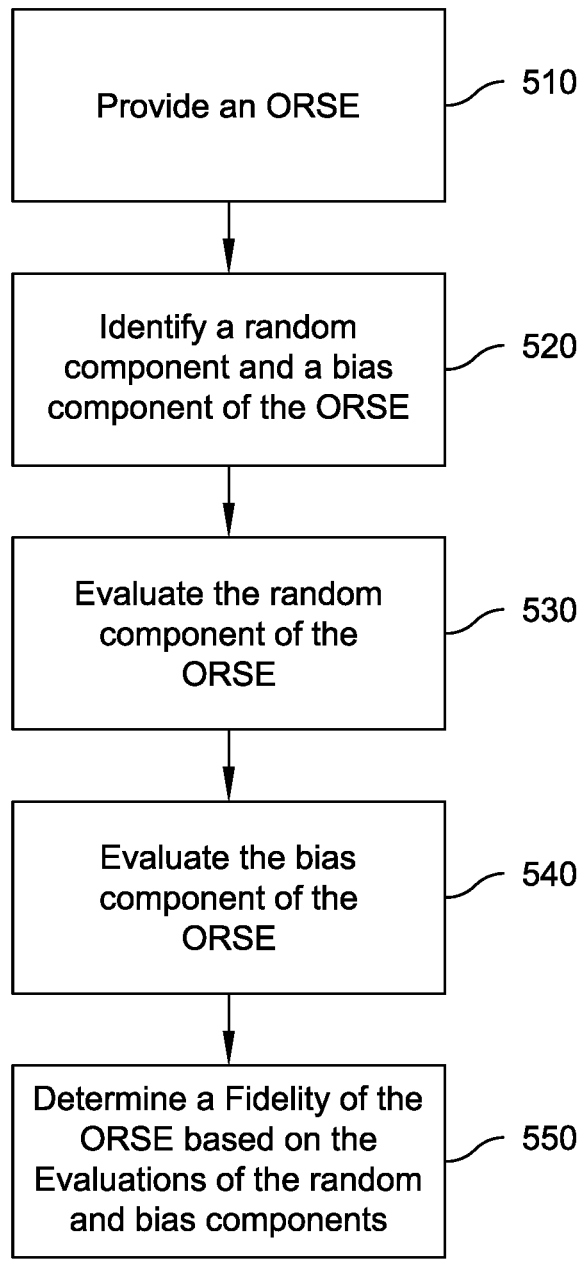
FIG. 5 depicts a flow diagram illustrating ORSE fidelity processing according to an aspect of the disclosure.

FIG. 5 depicts a flow diagram illustrating ORSE fidelity processing according to an aspect of the disclosure. At block 510, an ORSE filter system is provided, whose fidelity may be tested according to embodiments of the disclosure. As explained, an ORSE filter system is an Optimal Reduced State Estimation (ORSE) filters for tracking an object. ORSE filters are reduced state because parametric acceleration is not represented in the filter model but is instead estimated as an independently calculated part of the covariance matrix. The filter is optimal because it reduces errors in the least squares sense. ORSE filters include bounds or maximum excursions for various parameters, and minimizes the mean-square and, thus, the root-mean-square (RMS) estimation errors for the maximum excursions of the parameters in the truth model. Furthermore, because the bounds are included in the minimized covariance, embodiments of the present invention do not need white plant noise, as is required by Kalman filters, to cope with the reduced state. At block 520, random and bias components or covariances of the ORSE filter system are identified. As noted, in an embodiment the ORSE covariance may be represented by the equation ORSE covariance S=M+B is comprised of a random covariance M consistent with the covariance fidelity test, and a bias covariance B corresponding to 100% bias containment.

At block 530, the random component or covariance of the ORSE covariance may be evaluated. As discussed, in an embodiment the ORSE filter random component may be evaluated by running or applying zero-mean random Gaussian noise on the input measurements or as input measurements N times. Then covariance fidelity of the random component may be illustrated by plotting containment vs. $MDV_0$ at update n according to $$MDV_0 = \frac{X_n X_n^T}{\sigma_{m,n}^2}.$$

At block 540, the bias component or covariance of the ORSE covariance may be evaluated. As discussed, in an embodiment the evaluation may comprise initializing the ORSE filter with a diagonal matrix of eigenvalues Λ representing the squared maximum bias that the target is expected to experience over an interval. Then data may be input into the filter that is arbitrary but which satisfies the bias assumption, i.e. that the squared magnitude of bias does not exceed the eigen values of Λ. A covariance fidelity plot may be then be made in the same manner as for random Gaussian data using $$MDV_0 = \frac{X_n X_n^T}{\sigma_{b,n}^2}$$

or $MDV_0 = X_n B_n^{-1} X_n^T$ for the general case.

At block 550, a fidelity of the ORSE covariance may be determined based on the evaluation of the random component or covariance and the evaluation of the bias component or covariance. With respect to the random component, containment must satisfy the selected conditions, i.e. for the ideal Gaussian distribution there is a unique probability $(1-\alpha)$ that a random sample will have an MDV not exceeding $\chi^2(1,\alpha)$. For covariance fidelity testing the probability $(1-\alpha)$ must correspond to an MDV falling within $\chi^2(1,\alpha) \pm c$ where c is typically 5% or 10%. For multi-dimensional white noise with $MDV_0 = X_n M_n^{-1} X_n^T$, the same test is applied with reference $\chi^2(r,\alpha)$ for any number of degrees of freedom/dimensions r. With respect to the bias component, bias covariance fidelity is then met if probability of containment at 1 MDV is 100%. Similarly if bias is constrained between two limits the test above may be run for each limit with performance indicated by containment between the MDVs corresponding to each limit.

Figure 6:
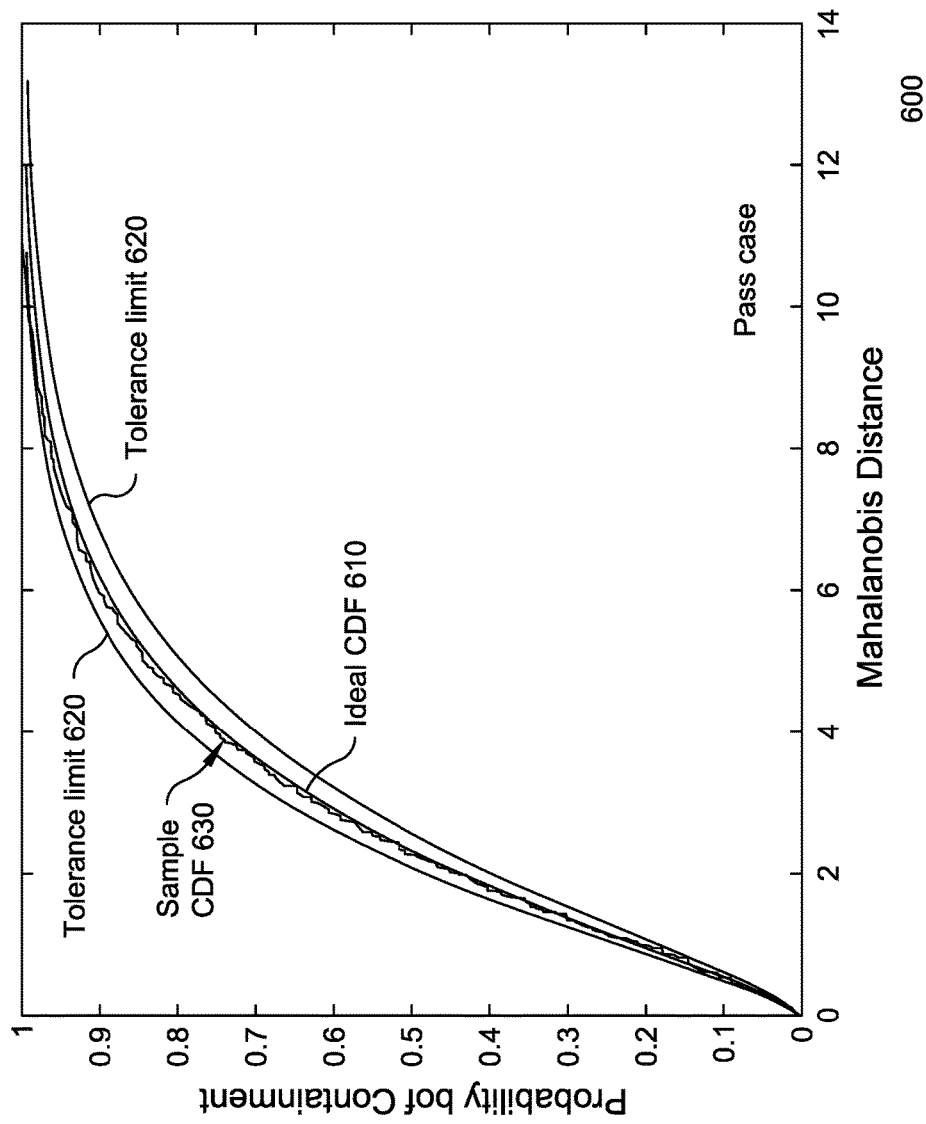
FIG. 6 is a plot that depicts probability of containment versus Mahalanobis Distance Value (MDV) for a random component of the ORSE filter in which the fidelity test is passed.

FIG. 6 is a plot 600 that depicts probability of containment versus Mahalanobis Distance Value (MDV) for a random component of the ORSE filter in which the fidelity test is passed. As disclosed, to test the fidelity of the random component of the ORSE filter, random noise inputs are made to the filter. The ideal cdf that could be expected from the random inputs is represented by line 610. Tolerance limits are depicted by lines 620, and may typically be selected to be within 5% or 10% of the ideal cdf, corresponding to $\chi^2(1,\alpha) \pm c$ where c is typically 5% or 10%. The actual result obtained from the random noise inputs may be shown as cdf 630. As shown in FIG. 6, the sample cdf 630 closely matches the ideal cdf 610, and is within tolerance limits 620. Therefore, FIG. 6 depicts a case where the fidelity test for the random component of the ORSE filter is passed.

Figure 7:
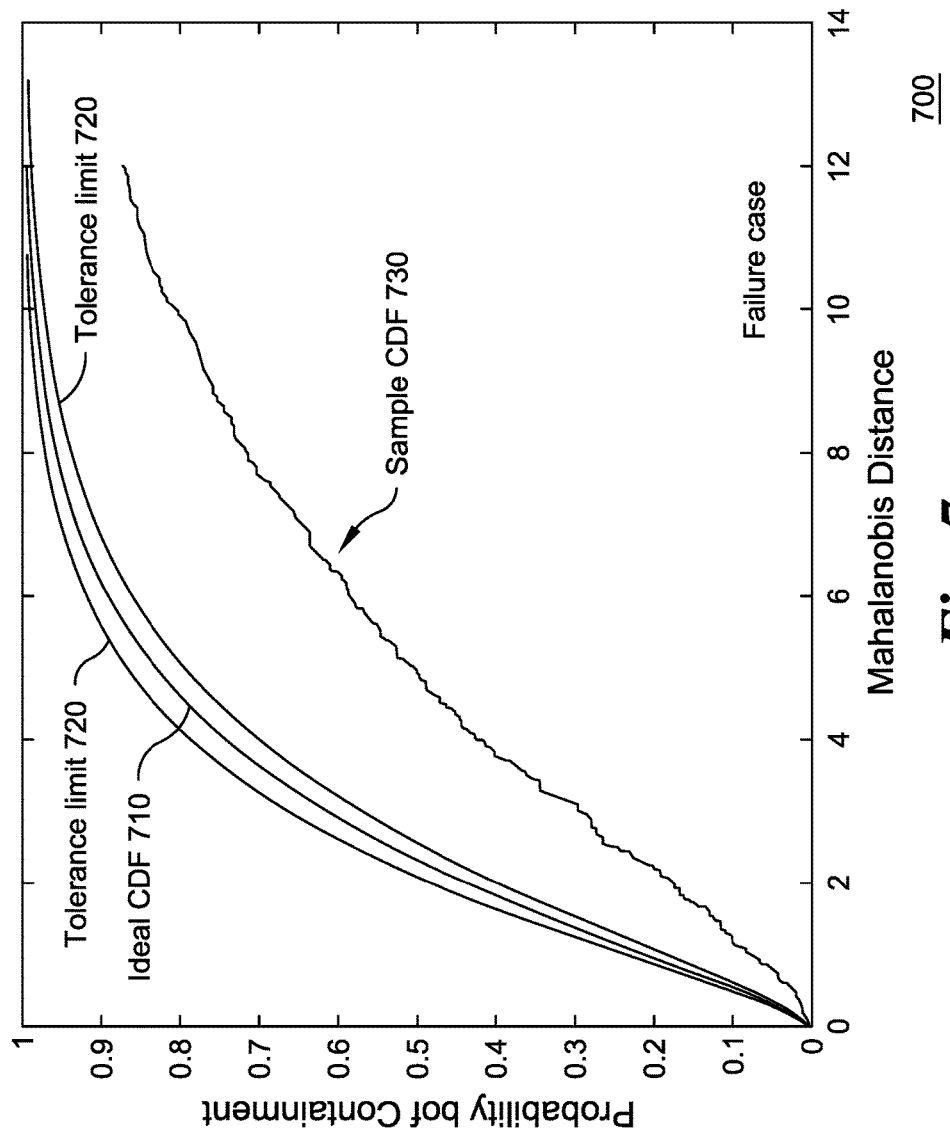
FIG. 7 is a plot that depicts probability of containment versus Mahalanobis Distance Value (MDV) for a random component of the ORSE filter in which the fidelity test is failed.

FIG. 7 is a plot 700 that depicts probability of containment versus Mahalanobis Distance Value (MDV) for a random component of the ORSE filter in which the fidelity test is failed. As noted, to test the fidelity of the random component of the ORSE filter, random noise inputs are made to the filter. The ideal cdf that could be expected from the random inputs is represented by line 710. Tolerance limits are depicted by lines 720, and may typically be selected to be within 5% or 10% of the ideal cdf, corresponding to $\chi^2(1,\alpha) \pm c$ where c is typically 5% or 10%. The actual result obtained from the random noise inputs may be shown as cdf 730. As shown in FIG. 7, the sample cdf 730 is undercompensating in comparison to the ideal cdf 710, and is outside of the tolerance limits 720. Therefore, FIG. 7 depicts a case where the fidelity test for the random component of the ORSE filter is failed.

Figure 8:
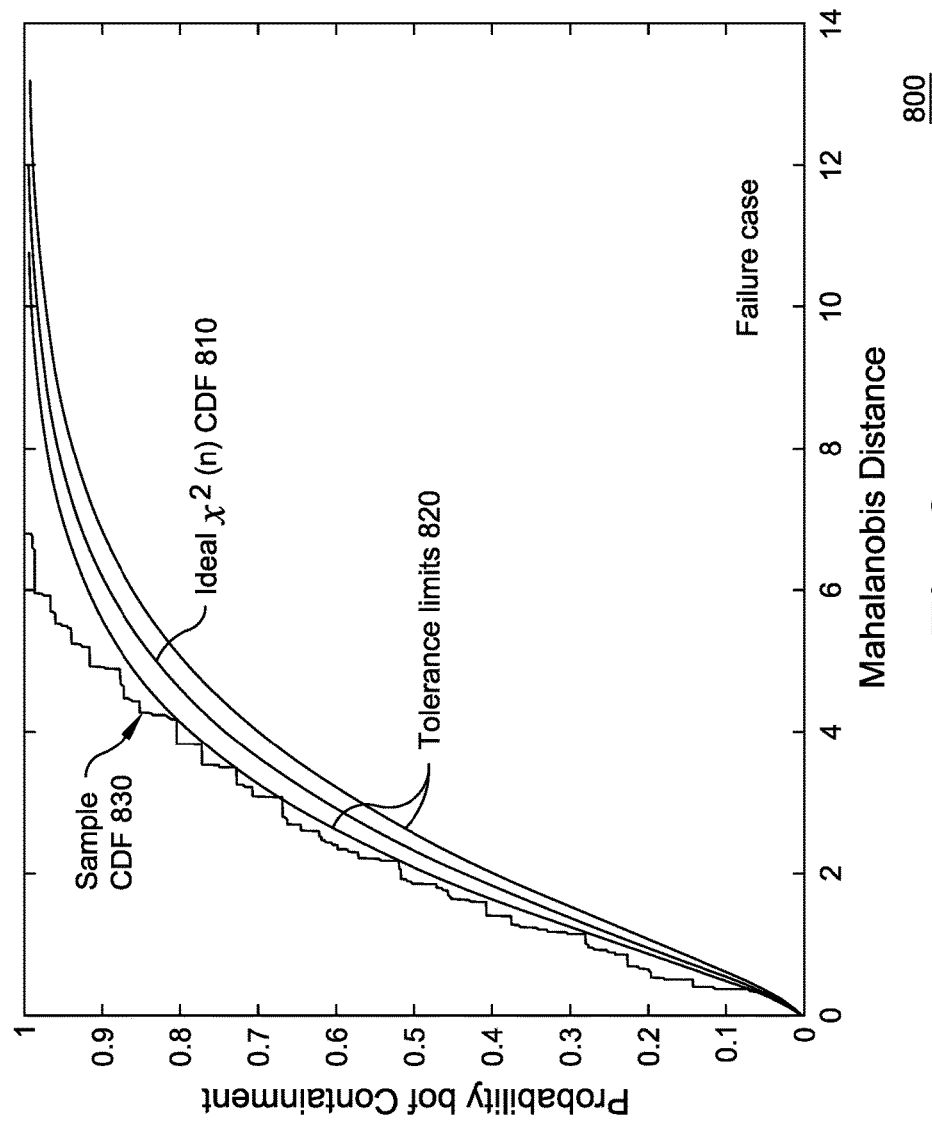
FIG. 8 is a plot that depicts probability of containment versus Mahalanobis Distance Value (MDV) for a random component of the ORSE filter in which the fidelity test is failed.

FIG. 8 is a plot 800 that depicts probability of containment versus Mahalanobis Distance Value (MDV) for a random component of the ORSE filter in which the fidelity test is failed. The ideal cdf obtained from random noise inputs is represented by line 810. Tolerance limits are depicted by lines 820, and may typically be selected to be within 5% or 10% of the ideal cdf, corresponding to $\chi^2(1,\alpha) \pm c$ where c is typically 5% or 10%. The result from the random noise input may be shown as cdf 830. As shown in FIG. 8, the sample cdf 830 is overcompensating in comparison to the ideal cdf 810, and is outside of the tolerance limits 820. Therefore, FIG. 8 depicts a case where the fidelity test for the random component of the ORSE filter is failed.

Figure 9:
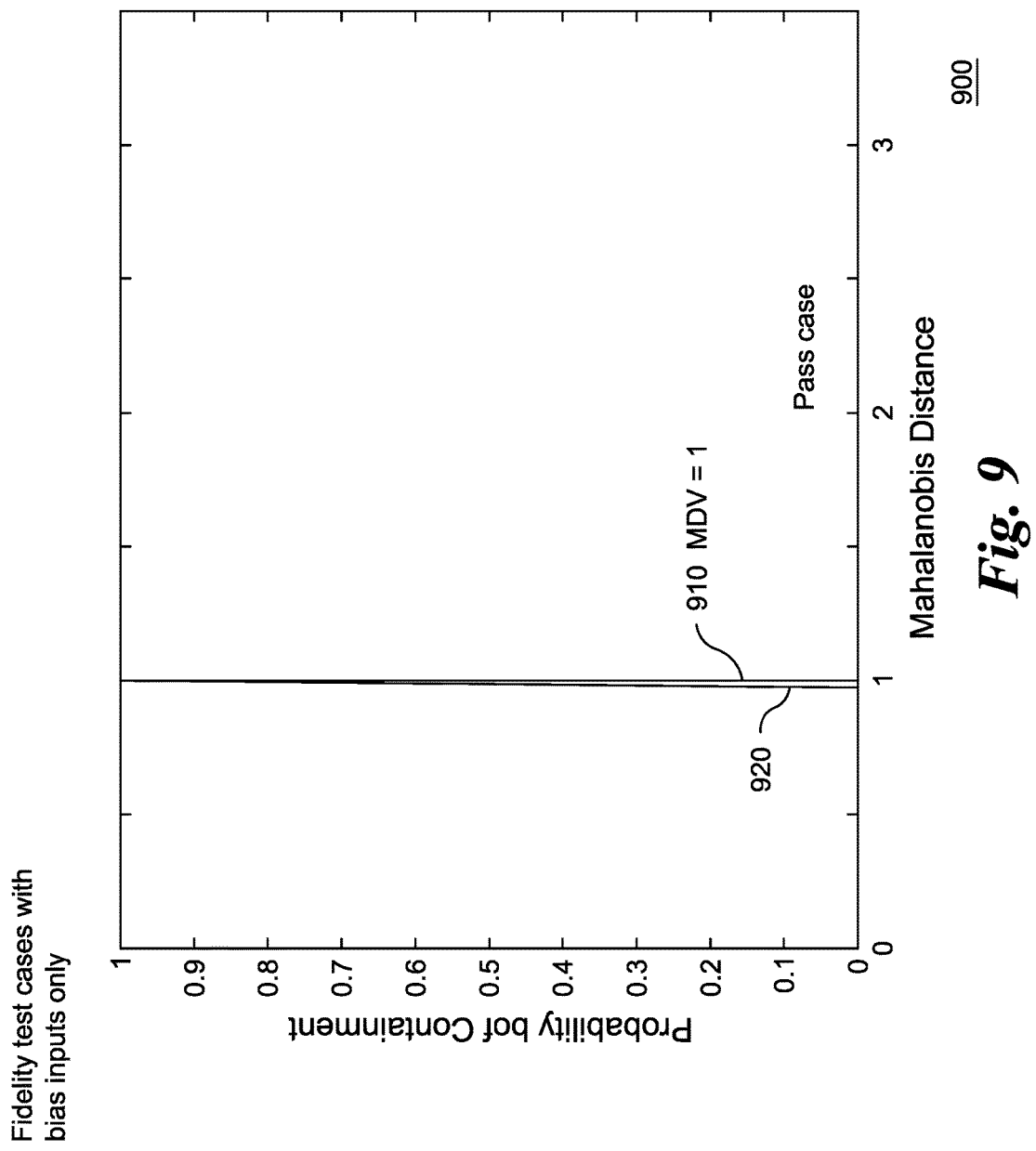
FIG. 9 is a plot that depicts probability of containment versus Mahalanobis Distance Value (MDV) for a bias component of the ORSE filter in which the fidelity test is passed.

FIG. 9 is a plot 900 that depicts probability of containment versus Mahalanobis Distance Value (MDV) for a bias component of the ORSE filter in which the fidelity test is passed. As noted, for the fidelity test for the bias component of the ORSE filter, the data input to the filter is arbitrary as long as it satisfies the bias assumption, i.e. that the squared magnitude of bias does not exceed the eigen values of A. When testing the bias component, bias covariance fidelity is met if the probability of containment at 1 MDV is 100%. In FIG. 9, line 910 represents an MDV=1. Line 920 represents the result of the input of the arbitrary data to the ORSE filter, and coincides with line 910. Therefore, the sample of FIG. 9 depicts a case where the fidelity test for the bias component of the ORSE filter is met because the probability of containment coincides with an MDV of 1.

Figure 10:
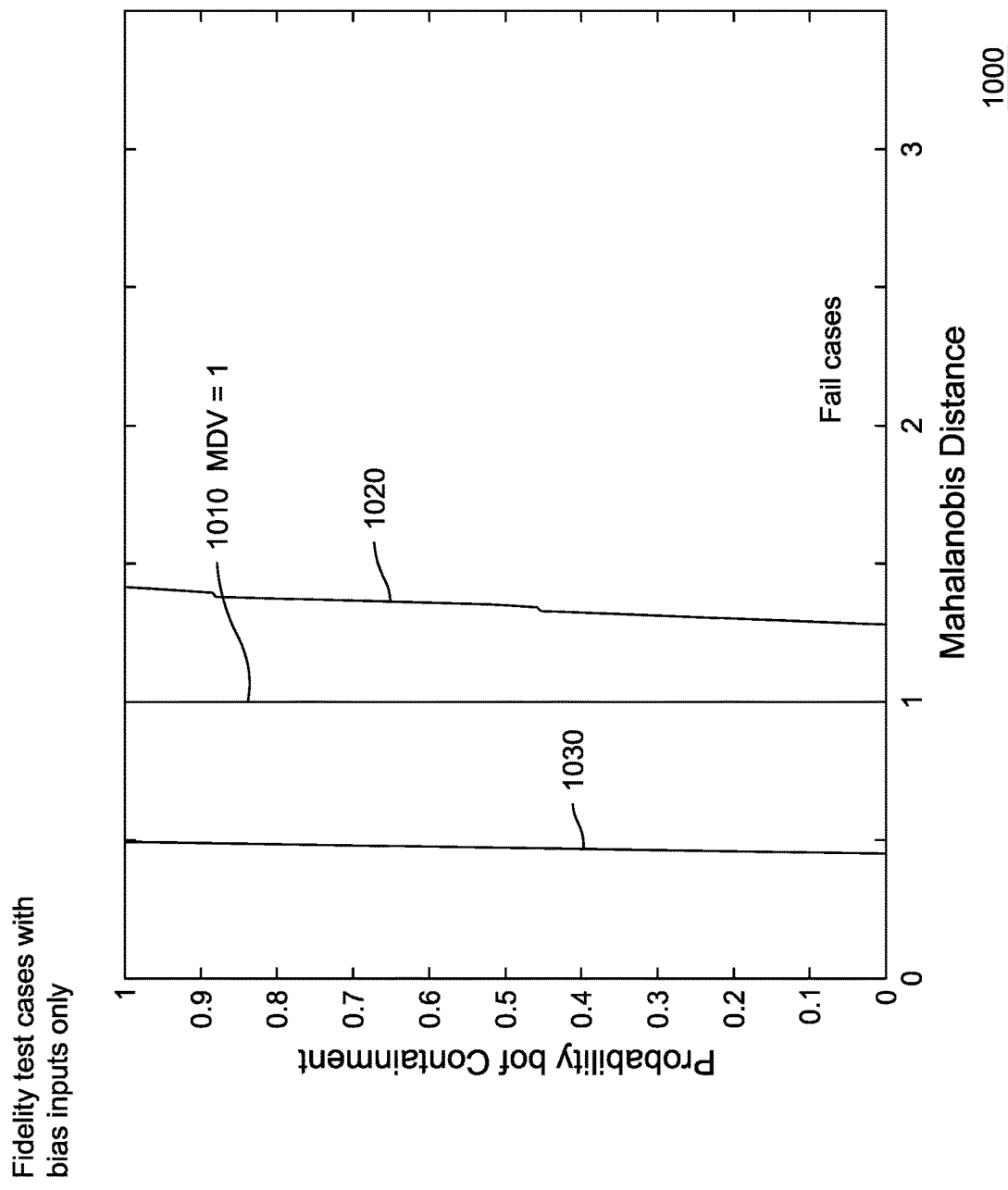
FIG. 10 is a plot that depicts probability of containment versus Mahalanobis Distance Value (MDV) for a bias component of the ORSE filter in which the fidelity test is failed.

FIG. 10 is a plot 1000 that depicts probability of containment versus Mahalanobis Distance Value (MDV) for a bias component of the ORSE filter in which the fidelity test is passed. As noted, for the fidelity test for the bias component of the ORSE filter, the data input to the filter is arbitrary as long as it satisfies the bias assumption, i.e. that the squared magnitude of bias does not exceed the eigen values of A. When testing the bias component, bias covariance fidelity is met if the probability of containment at 1 MDV is 100%. In FIG. 10, line 1010 represents an MDV=1. Line 1020 represents a first output result from a first input of arbitrary data to the ORSE filter. Line 1030 represents a second output result from a second input of arbitrary data to the ORSE filter. As shown, neither output line 1020 nor 1030 coincides with line 1010. Therefore, the sample of FIG. 9 depicts a case where the fidelity test for the bias component of the ORSE filter is not met by either of the outputs, because the probability of containment does not coincides with an MDV of 1.

The Processing system 210 (FIG. 1), including the above-described ORSE filters, is described and illustrated herein only as exemplary systems for performing the described ORSE reduced state estimation update processes, and other embodiments may be contemplated by one of skill in the pertinent art without departing from the intended scope of this disclosure. More generally, the process or processes explained herein may be performed by one or more processors, which processors access a memory device, the memory device containing instructions, which instructions, when executed by the processors, cause the steps of a method for state estimation to be performed by the processors. It is understood that the processes may also be performed by special-purpose hardware such as radar computer system processors, radar computer system memory and/or firmware, and radar computer system computer busses and communications ports. In other embodiments, the special-purpose hardware may be other types of hardware such as tracking computer system processors and related memory, firmware, busses, and ports. Thus, the entire process, or any part thereof, may be performed in hardware, software or any combination of hardware and/or software. Software may be embodied in a non-transitory machine readable medium upon which software instructions or program instructions may be stored, the stored instructions when executed by a processor cause the processor to perform the steps of the methods described herein. Any suitable machine readable medium may be used, including but not limited to, magnetic or optical disks, for example CD-ROM, DVD-ROM, floppy disks and the like. Other media also fall within the intended scope of this disclosure, for example, dynamic random access memory (DRAM), random access memory (RAM), read-only memory (ROM) or flash memory may also be used.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A system for testing a covariance fidelity of an optimal reduced state estimator (ORSE) comprising:
one or more data storage devices for storing testing data;
one or more computer processors in communication with the one or more data storage devices; and
a memory storing program instructions which, when executed by the one or more computer processors, cause the one or more computer processors to:
provide an optimal reduced state estimator having state variables and multidimensional time-varying parameters which are subject to known bounded values;
identify a random component and a bias component of a covariance fidelity test of the optimal reduced state estimator;
evaluate the random component of the covariance fidelity test at a selected epoch;
evaluate the bias component of the covariance fidelity test at the selected epoch; and
determine the covariance fidelity of the optimal reduced state estimator based on the evaluation of the random component of the covariance fidelity test and the evaluation of the bias component of the covariance fidelity test.

2. The system of claim 1, wherein the memory storing program instructions which cause the one or more computer processors to identify the random component and the bias component of the covariance fidelity test of the optimal reduced state estimator comprises the memory storing program instructions which cause the one or more computer processors to identify an optimal reduced state estimator covariance S=M+B comprised of a random component M and a bias component B.

3. The system of claim 1, wherein the memory storing program instructions which cause the one or more computer processors to evaluate the random component of the covariance fidelity test at the selected epoch comprises the memory storing program instructions which cause the one or more computer processors to:
apply a chi-square fidelity test to the random component of the covariance fidelity test using unbiased noisy input; and
evaluate output data of the chi-square fidelity test at the selected epoch and determine a Mahalanobis Distance Value (MDV) of the random component alone.

4. The system of claim 1, wherein the memory storing program instructions which cause the one or more computer processors to evaluate the random component of the covariance fidelity test at the selected epoch comprises the memory storing program instructions which cause the one or more computer processors to:
identify an evaluation time n;
apply zero-mean Gaussian noise N times as input measurements to the optimal reduced state estimator; and
determine containment vs. $MDV_0$ at update n according to $$MDV_0 = \frac{X_n X_n^T}{\sigma_{m,n}^2}$$

wherein X are random filter output errors and $\sigma^2_{m,n}$ is the random component represented in matrix form for multiple dimensions at n.

5. The system of claim 4, wherein the memory storing program instructions which cause the one or more computer processors to determine the covariance fidelity of the optimal reduced state estimator comprises the memory storing program instructions which cause the one or more computer processors to determine that the optimal reduced state estimator passes the random component of the covariance fidelity test when a probability of containment of $(1-\alpha)$ corresponds to an MDV falling within a selected tolerance limit of an ideal cumulative distribution function $\chi^2(1,\alpha)$.

6. The system of claim 1, wherein the memory storing program instructions which cause the one or more computer processors to evaluate the random component of the covariance fidelity test at the selected epoch comprises the memory storing program instructions which cause the one or more computer processors to:
  identify an evaluation time n;
  apply multi-dimensional white noise N times as input measurements to the optimal reduced state estimator; and
  determine containment vs. $MDV_0$ at update n according to $MDV_0 = X_n M_n^{-1} X_n^T$ wherein X are random filter output errors and M is the random component.

7. The system of claim 4, wherein the memory storing program instructions which cause the one or more computer processors to determine the covariance fidelity of the optimal reduced state estimator comprises the memory storing program instructions which cause the one or more computer processors to determine that the optimal reduced state estimator passes the random component of the covariance fidelity test when a probability of containment of $(1-\alpha)$ corresponds to an MDV falling within $\chi^2(r,\alpha)$ for any number of degrees of freedom/dimensions r.

8. The system of claim 1, wherein the memory storing program instructions which cause the one or more computer processors to evaluate the bias component of the covariance fidelity test at the selected epoch comprises the memory storing program instructions which cause the one or more computer processors to:
  initialize the bias component of the covariance fidelity test with a diagonal matrix of eigenvalues $\Lambda$ representing a squared maximum bias that a target is expected to experience over an interval;
  input measurements to the optimal reduced state estimator that do not exceed the maximum bias;
  generate a covariance fidelity plot corresponding to $$MDV_0 = \frac{X_n X_n^T}{\sigma_{b,n}^2}$$

wherein X are biased filter output errors and $\sigma_{b,n}^2$ is a one-dimensional bias covariance represented in matrix form for multiple dimensions; and
  determine, based on the covariance fidelity plot, a probability of containment at 1 MDV.

9. The system of claim 8, wherein the memory storing program instructions which cause the one or more computer processors to determine the covariance fidelity of the optimal reduced state estimator comprises the memory storing program instructions which cause the one or more computer processors to determine that the optimal reduced state estimator passes the bias component of the covariance fidelity test when the determined probability of containment at 1 MDV is 100%.

10. A method for testing a covariance fidelity of an optimal reduced state estimator (ORSE) comprising:
  providing, by one or more computer processors, an optimal reduced state estimator having state variables and multidimensional time-varying parameters which are subject to known bounded values;
  identifying, by the one or more computer processors, a random component of a covariance fidelity test of the optimal reduced state estimator and a bias component of the covariance fidelity test of the optimal reduced state estimator;
  evaluating, by the one or more computer processors, the random component of the covariance fidelity test at a selected epoch;
  evaluating, by the one or more computer processors, the bias component of the covariance fidelity test at the selected epoch; and
  determining, by the one or more computer processors, the covariance fidelity of the optimal reduced state estimator based on the evaluation of the random component of the covariance fidelity test and the evaluation of the bias component of the covariance fidelity test.

11. The method of claim 10, wherein evaluating the random component of the covariance fidelity test at the selected epoch comprises:
  applying, by the one or more computer processors, a chi-square fidelity test to the random component of the ORSE using unbiased noisy input; and
  evaluating, by the one or more computer processors, output data of the chi-square fidelity test at the selected epoch and determining a Mahalanobis Distance Value (MDV) of the random component alone.

12. The method of claim 10, wherein evaluating the random component of the covariance fidelity test at the selected epoch of the random component comprises:
  identifying, by the one or more computer processors, an evaluation time n;
  applying, by the one or more computer processors, zero-mean Gaussian noise N times as input measurements to the optimal reduced state estimator; and
  determining, by the one or more computer processors, containment vs. $MDV_0$ at update n according to $$MDV_0 = \frac{X_n X_n^T}{\sigma_{m,n}^2}$$

wherein X are random filter output errors and $\sigma_{m,n}^2$ is the random component represented in matrix form for multiple dimensions at n.

13. The method of claim 12, wherein determining the covariance fidelity of the optimal reduced state estimator comprises determining, by the one or more computer processors, that the optimal reduced state estimator passes the random component of the covariance fidelity test when a probability of containment of $(1-\alpha)$ corresponds to an MDV falling within a selected tolerance limit of an ideal cumulative distribution function $\chi^2(1,\alpha)$.

14. The method of claim 10, wherein evaluating the random component of the covariance fidelity test at the selected epoch comprises:
  identifying, by the one or more computer processors, an evaluation time n;
  applying, by the one or more computer processors, multi-dimensional white noise N times as input measurements to the optimal reduced state estimator; and
  determining, by the one or more computer processors, containment vs. $MDV_0$ at update n according to $MDV_0 = X_n M_n^{-1} X_n^T$ wherein X are random filter output errors and M is the random component.

15. The method of claim 14, wherein determining the covariance fidelity of the optimal reduced state estimator comprises determining, by the one or more computer processors, that the optimal reduced state estimator passes the random component of the covariance fidelity test when a probability of containment of $(1-\alpha)$ corresponds to an MDV falling within $\chi^2(r,\alpha)$ for any number of degrees of freedom/dimensions r.

16. The method of claim 10, wherein evaluating the bias component of the covariance fidelity test at the selected epoch and determining a probability of containment at a selected MDV comprises:

initializing, by the one or more computer processors, the bias component of the covariance fidelity test with a diagonal matrix of eigenvalues Λ representing a squared maximum bias that a target is expected to experience over an interval;

inputting, by the one or more computer processors, measurements to the optimal reduced state estimator that do not exceed the maximum bias;

plotting, by the one or more computer processors, the covariance fidelity corresponding to $$MDV_0 = \frac{X_n X_n^T}{\sigma_{b,n}^2}$$

wherein X are biased filter output errors and $\sigma_{b,n}^2$ is a one-dimensional bias covariance represented in matrix form for multiple dimensions; and determining, by the one or more computer processors based on the covariance fidelity plot, the probability of containment at 1 MDV.

17. The method of claim 16, wherein determining the covariance fidelity of the optimal reduced state estimator comprises determining, by the one or more computer processors, that the optimal reduced state estimator passes the bias component of the covariance fidelity test when the determined probability of containment at 1 MDV is 100%.

18. A system for testing a covariance fidelity of an optimal reduced state estimator (ORSE) comprising:

one or more data storage devices for storing testing data;

one or more computer processors in communication with the one or more data storage devices;

a memory storing program instructions which, when executed by the one or more computer processors, cause the one or more computer processors to:

provide an optimal reduced state estimator having state variables and multidimensional time-varying parameters which are subject to known bounded values;

identify a random component of a covariance fidelity test of the optimal reduced state estimator and a bias component of the covariance fidelity test of the optimal reduced state estimator;

evaluate the random component of the covariance fidelity test at a selected epoch and determine a Mahalanobis Distance Value (MDV) of the random component by:

identifying an evaluation time n;

applying zero-mean Gaussian noise N times as input measurements to the optimal reduced state estimator; and determining containment vs. $MDV_0$ at update n according to $$MDV_0 = \frac{X_n X_n^T}{\sigma_{m,n}^2}$$

wherein X are random filter output errors and $\sigma_{m,n}^2$ is the random component represented in matrix form for multiple dimensions at n;

evaluate the bias component of the covariance fidelity test at the selected epoch and determine a probability of containment at a selected MDV by:

initializing the bias component of the covariance fidelity test with a diagonal matrix of eigenvalues Λ representing a squared maximum bias that a target is expected to experience over an interval;

inputting measurements to the optimal reduced state estimator that do not exceed the maximum bias;

generating a covariance fidelity plot corresponding to $$MDV_0 = \frac{X_n X_n^T}{\sigma_{b,n}^2}$$

wherein X are the biased filter output errors and $\sigma_{b,n}^2$ is the one-dimensional bias component represented in matrix form for multiple dimensions; and determining, based on the covariance fidelity plot, the probability of containment at 1 MDV; and determine the covariance fidelity of the optimal reduced state estimator based on the evaluation of the random component of the covariance fidelity and the evaluation of the bias component of the covariance fidelity.

19. The system of claim 18, wherein the memory storing program instructions which cause the one or more computer processors to determine the covariance fidelity of the optimal reduced state estimator comprises the memory storing program instructions which cause the one or more computer processors to determine that the optimal reduced state estimator passes the random component of the covariance fidelity test when the probability of containment of (1−α) corresponds to an MDV falling within a selected tolerance limit of an ideal cumulative distribution function $\chi^2(1,\alpha)$.

20. The system of claim 19, wherein the memory storing program instructions which cause the one or more computer processors to determine the covariance fidelity of the optimal reduced state estimator comprises the memory storing program instructions which cause the one or more computer processors to determine that the optimal reduced state estimator passes the bias component of the covariance fidelity test when the determined probability of containment at 1 MDV is 100%.

* * * * *